US012055655B2

(12) United States Patent
Wang et al.

(10) Patent No.: US 12,055,655 B2
(45) Date of Patent: Aug. 6, 2024

(54) SIGNAL-TO-NOISE RATIO RANGE CONSISTENCY CHECK FOR RADAR GHOST TARGET DETECTION

(71) Applicant: Intel Corporation, Santa Clara, CA (US)

(72) Inventors: Qian Wang, Portland, OR (US); Shabbir Ahmed, Beaverton, OR (US); Christopher Gutierrez, Hillsboro, OR (US); Wen-Ling Huang, Los Altos, CA (US); Marcio Juliato, Portland, OR (US); Saiveena Kesaraju, Mountain View, CA (US); Vuk Lesi, Cornelius, OR (US); Manoj Sastry, Portland, CA (US); Ivan Simoes Gaspar, West Linn, OR (US)

(73) Assignee: INTEL CORPORATION, Santa Clara, CA (US)

( * ) Notice: Subject to any disclaimer, the term of this patent is extended or adjusted under 35 U.S.C. 154(b) by 390 days.

(21) Appl. No.: 17/357,892

(22) Filed: Jun. 24, 2021

(65) Prior Publication Data

US 2021/0325508 A1   Oct. 21, 2021

(51) Int. Cl.
*G01S 7/28* (2006.01)
*G01S 7/02* (2006.01)
*G01S 7/292* (2006.01)
*G01S 7/35* (2006.01)
*G01S 13/931* (2020.01)

(52) U.S. Cl.
CPC .......... *G01S 7/2813* (2013.01); *G01S 7/023* (2013.01); *G01S 7/2922* (2013.01); *G01S 7/354* (2013.01); *G01S 13/931* (2013.01)

(58) Field of Classification Search
CPC ...... G01S 13/931; G01S 7/354; G01S 7/2813; G01S 7/023; G01S 7/23; G01S 7/2922
USPC .......................................................... 342/70
See application file for complete search history.

(56) References Cited

U.S. PATENT DOCUMENTS

| | | | | |
|---|---|---|---|---|
| 3,943,511 A | * | 3/1976 | Evans | H01Q 3/2629 342/194 |
| 5,243,182 A | * | 9/1993 | Murata | H03K 17/16 250/221 |
| 5,546,085 A | * | 8/1996 | Garnaat | G01S 7/023 342/25 A |

(Continued)

FOREIGN PATENT DOCUMENTS

| KR | 20200016482 A | 2/2020 | | |
|---|---|---|---|---|
| WO | WO-2018109529 A1 | * | 6/2018 | ............. H04L 29/06 |

OTHER PUBLICATIONS

European Search Report dated Jul. 27, 2022, issued in EP 22161623.8 (10 pages).

(Continued)

*Primary Examiner* — Vladimir Magloire
*Assistant Examiner* — Michael W Justice
(74) *Attorney, Agent, or Firm* — KDW Firm PLLC

(57) ABSTRACT

Systems, apparatuses, and methods to response to distinguish a ghost target from an actual target based on radar signals is provided. In particular, the disclosure provides an intrusion detection system adapted to receive radar signals and distinguish a potential ghost target from a legitimate target based on a signal to noise ratio of the radar signals and a range to the ghost target and the legitimate target.

17 Claims, 7 Drawing Sheets

(56) References Cited

U.S. PATENT DOCUMENTS

| | | | | |
|---|---|---|---|---|
| 5,633,642 A * | 5/1997 | Hoss | B60K 31/0008 | 342/70 |
| 6,011,515 A * | 1/2000 | Radcliffe | G01P 3/64 | 340/936 |
| 6,556,871 B2 * | 4/2003 | Schmitt | A61N 1/37211 | 607/30 |
| 6,714,520 B1 * | 3/2004 | Okamura | H04L 5/143 | 375/296 |
| 6,801,580 B2 * | 10/2004 | Kadous | H04L 1/0618 | 375/267 |
| 6,844,843 B2 * | 1/2005 | Ishii | G01S 7/4021 | 342/91 |
| 7,042,344 B2 * | 5/2006 | Chiba | G01S 13/66 | 340/686.6 |
| 7,058,144 B2 * | 6/2006 | Baldwin | H04L 25/0212 | 375/229 |
| 7,194,041 B2 * | 3/2007 | Kadous | H04L 1/0618 | 375/267 |
| 7,265,665 B2 * | 9/2007 | Bouchard | G08B 13/1427 | 340/539.11 |
| 7,339,517 B2 * | 3/2008 | Nakanishi | G01S 13/343 | 342/91 |
| 7,366,148 B2 * | 4/2008 | Muaddi | H04L 63/1416 | 455/445 |
| 7,460,058 B2 * | 12/2008 | Nakanishi | G01S 7/36 | 342/28 |
| 7,623,061 B2 * | 11/2009 | Spyropulos | G01S 7/412 | 342/170 |
| 7,729,680 B2 * | 6/2010 | Gozen | H04B 1/1027 | 455/226.1 |
| 7,760,680 B2 * | 7/2010 | Chen | H04L 47/822 | 455/452.2 |
| 7,773,031 B2 * | 8/2010 | Gazelle | G01S 7/2926 | 342/174 |
| 8,125,375 B2 * | 2/2012 | Nakanishi | G01S 7/023 | 342/91 |
| 8,234,322 B2 * | 7/2012 | Saito | G06F 7/588 | 708/250 |
| 8,243,790 B2 * | 8/2012 | Leontaris | H04N 19/107 | 375/E7.243 |
| 8,456,349 B1 * | 6/2013 | Piesinger | G01S 13/46 | 342/36 |
| 8,723,719 B1 * | 5/2014 | Piesinger | H01Q 13/22 | 342/146 |
| 8,750,372 B2 * | 6/2014 | Leontaris | H04N 19/553 | 382/162 |
| 8,830,117 B2 * | 9/2014 | Maeno | G01S 7/2927 | 342/91 |
| 8,874,390 B2 * | 10/2014 | Rick | G01S 15/58 | 702/50 |
| 9,063,213 B2 * | 6/2015 | Himmelstoss | G01S 13/931 | |
| 9,110,168 B2 * | 8/2015 | Mohamadi | G05D 1/0669 | |
| 9,444,502 B2 * | 9/2016 | Kpodzo | H04B 1/109 | |
| 9,748,987 B2 * | 8/2017 | Kpodzo | H04B 17/318 | |
| 9,755,790 B2 * | 9/2017 | Lobo | H04B 17/26 | |
| 10,054,672 B2 * | 8/2018 | Fetterman | G01S 13/726 | |
| 10,067,221 B2 * | 9/2018 | Ginsburg | G01S 13/32 | |
| 10,261,172 B2 * | 4/2019 | Lim | G01S 13/931 | |
| 10,271,301 B2 * | 4/2019 | Batra | H04B 17/27 | |
| 10,353,063 B2 * | 7/2019 | Sakamoto | G01S 7/354 | |
| 10,585,195 B2 * | 3/2020 | Marmet | H04B 1/7113 | |
| 10,775,221 B2 * | 9/2020 | Blomberg | G01S 7/354 | |
| 10,962,640 B2 * | 3/2021 | Kaino | G01S 13/343 | |
| 10,977,946 B2 * | 4/2021 | Thapani | B60W 40/10 | |
| 11,275,174 B2 * | 3/2022 | Smith | G01S 7/023 | |
| 11,575,196 B2 * | 2/2023 | Kawaguchi | H01Q 1/38 | |
| 2003/0048223 A1 * | 3/2003 | Kezys | H04B 7/0857 | 342/368 |
| 2003/0058962 A1 * | 3/2003 | Baldwin | H04L 1/20 | 375/316 |
| 2003/0103520 A1 * | 6/2003 | Chen | H04L 47/801 | 370/444 |
| 2003/0189999 A1 * | 10/2003 | Kadous | H04L 1/0618 | 375/267 |
| 2004/0108952 A1 * | 6/2004 | Ishii | G01S 7/4021 | 342/111 |
| 2004/0162995 A1 * | 8/2004 | Muaddi | H04L 63/1408 | 709/224 |
| 2004/0217869 A1 * | 11/2004 | Bouchard | G01S 13/825 | 340/539.13 |
| 2004/0239490 A1 * | 12/2004 | Chiba | G08G 1/166 | 340/435 |
| 2005/0008092 A1 * | 1/2005 | Kadous | H04L 1/0618 | 375/267 |
| 2005/0198091 A1 * | 9/2005 | Saito | G06F 7/588 | 708/250 |
| 2007/0103360 A1 * | 5/2007 | Nakanishi | G01S 13/343 | 342/111 |
| 2007/0171122 A1 * | 7/2007 | Nakano | G01S 7/023 | 342/91 |
| 2008/0064357 A1 * | 3/2008 | Gozen | G10L 21/0208 | 455/296 |
| 2008/0094274 A1 * | 4/2008 | Nakanishi | G01S 7/023 | 342/91 |
| 2008/0111733 A1 * | 5/2008 | Spyropulos | G01S 13/931 | 342/189 |
| 2009/0086814 A1 * | 4/2009 | Leontaris | H04N 19/553 | 375/E7.243 |
| 2009/0201195 A1 * | 8/2009 | Gazelle | G01S 13/89 | 342/174 |
| 2009/0262928 A1 * | 10/2009 | Busari | G06F 7/588 | 708/250 |
| 2010/0254263 A1 * | 10/2010 | Chen | H04L 47/83 | 370/232 |
| 2011/0050484 A1 * | 3/2011 | Nakanishi | G01S 7/023 | 342/87 |
| 2012/0007767 A1 * | 1/2012 | Maeno | G01S 7/2927 | 342/92 |
| 2012/0245863 A1 * | 9/2012 | Rick | G01F 15/06 | 702/50 |
| 2012/0275514 A1 * | 11/2012 | Leontaris | H04N 19/172 | 375/E7.125 |
| 2013/0021196 A1 * | 1/2013 | Himmelstoss | G01S 7/023 | 342/159 |
| 2013/0271310 A1 * | 10/2013 | Izumi | G01S 7/4008 | 342/368 |
| 2013/0309975 A1 * | 11/2013 | Kpodzo | H04B 17/336 | 455/63.1 |
| 2014/0222246 A1 * | 8/2014 | Mohamadi | G05D 1/0669 | 701/2 |
| 2014/0313080 A1 * | 10/2014 | Smith | H01Q 19/28 | 342/368 |
| 2014/0355468 A1 * | 12/2014 | Li | H04W 72/23 | 370/252 |
| 2016/0291130 A1 * | 10/2016 | Ginsburg | G01S 13/32 | |
| 2017/0026126 A1 * | 1/2017 | Kpodzo | H04B 1/10 | |
| 2017/0059695 A1 * | 3/2017 | Fetterman | G01S 13/931 | |
| 2017/0102459 A1 * | 4/2017 | Sakamoto | G01S 13/347 | |
| 2017/0168139 A1 * | 6/2017 | Lim | G01S 7/2921 | |
| 2017/0363736 A1 * | 12/2017 | Kaino | G01S 13/931 | |
| 2017/0363738 A1 * | 12/2017 | Kaino | G01S 13/584 | |
| 2017/0374641 A1 * | 12/2017 | Batra | G01S 5/0244 | |
| 2018/0074207 A1 * | 3/2018 | Marmet | H04B 1/709 | |
| 2018/0348364 A1 * | 12/2018 | Liu | G01S 13/91 | |
| 2018/0366818 A1 * | 12/2018 | Kawaguchi | H01Q 19/005 | |
| 2019/0122556 A1 * | 4/2019 | Thapani | B62D 6/003 | |
| 2019/0271775 A1 * | 9/2019 | Zhang | G01S 13/003 | |
| 2019/0369221 A1 * | 12/2019 | Umehira | G01S 13/34 | |
| 2020/0075035 A1 * | 3/2020 | Garth, III | H02P 8/22 | |
| 2020/0088838 A1 * | 3/2020 | Melzer | G01S 7/023 | |
| 2021/0063566 A1 * | 3/2021 | Smith | G06V 20/58 | |
| 2021/0132185 A1 * | 5/2021 | Lin | G01S 13/343 | |
| 2021/0389446 A1 * | 12/2021 | Sugae | G01S 13/343 | |
| 2023/0056263 A1 * | 2/2023 | Kim | H04B 7/0626 | |

(56) References Cited

U.S. PATENT DOCUMENTS

2023/0184926 A1\* 6/2023 Owechko ............... G06V 10/62
  342/195
2023/0198594 A1\* 6/2023 Kim .................... H04B 7/0626
  370/252

OTHER PUBLICATIONS

Budge et al., "Radar Range Equation", Jan. 10, 2017 (Jan. 10, 2017), pp. 1-14, Retrieved from the Internet: URL: http://www.ece.uah.edu/courses/material/EE619-2011/ RadarRangeEquation(2)2011.pdf.

Foo Kune et al., "Ghost Talk: Mitigating EMI Signal Injection Attacks against Analog Sensors", Security and Privacy (SP), 2013 IEEE Symposium On, IEEE, May 19, 2013 (May 19, 2013), pp. 145-159, DOI: 10.1109/SP.2013.20.

Harun et al., "A Survey: Spoofing Attacks in Physical Layer Security", 2015 IEEE 40th Local Computer Networks Conference Workshops (LCN Workshops), IEEE, Oct. 26, 2015 (Oct. 26, 2015), pp. 812-817. DOI: 10.1109/LCNW.2015.7365932.

Sawicki D., "Radar Range Equation", Jun. 30, 2019 (Jun. 30, 2019), pp. 1-2, Retrieved from the Internet: URL:https://copradar.com/rdrrange/index.html#detrng.

Bin Tian et al.. "11az Secure LTF Design" IEEE Draft; 802.11-20/0836r0—vol. 802.11az—Dated: 2020, pp. 1-56.

\* cited by examiner

SIGNAL-TO-NOISE RATIO RANGE CONSISTENCY CHECK FOR RADAR GHOST TARGET DETECTION

BACKGROUND

Modern vehicles often include range sensing technologies. For example, modern vehicles can include radar sensing components to provide automated braking assistance, collision avoidance, or the like as part of autonomous driving or safety package.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments of the present disclosure provide for identifying "ghosts" detected as valid objects by a radar system. For example, in the case of a vehicle, the present disclosure provides to identify false detections or detections resulting from a malicious attempt to cause the radar system to detect an object where no object exists.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
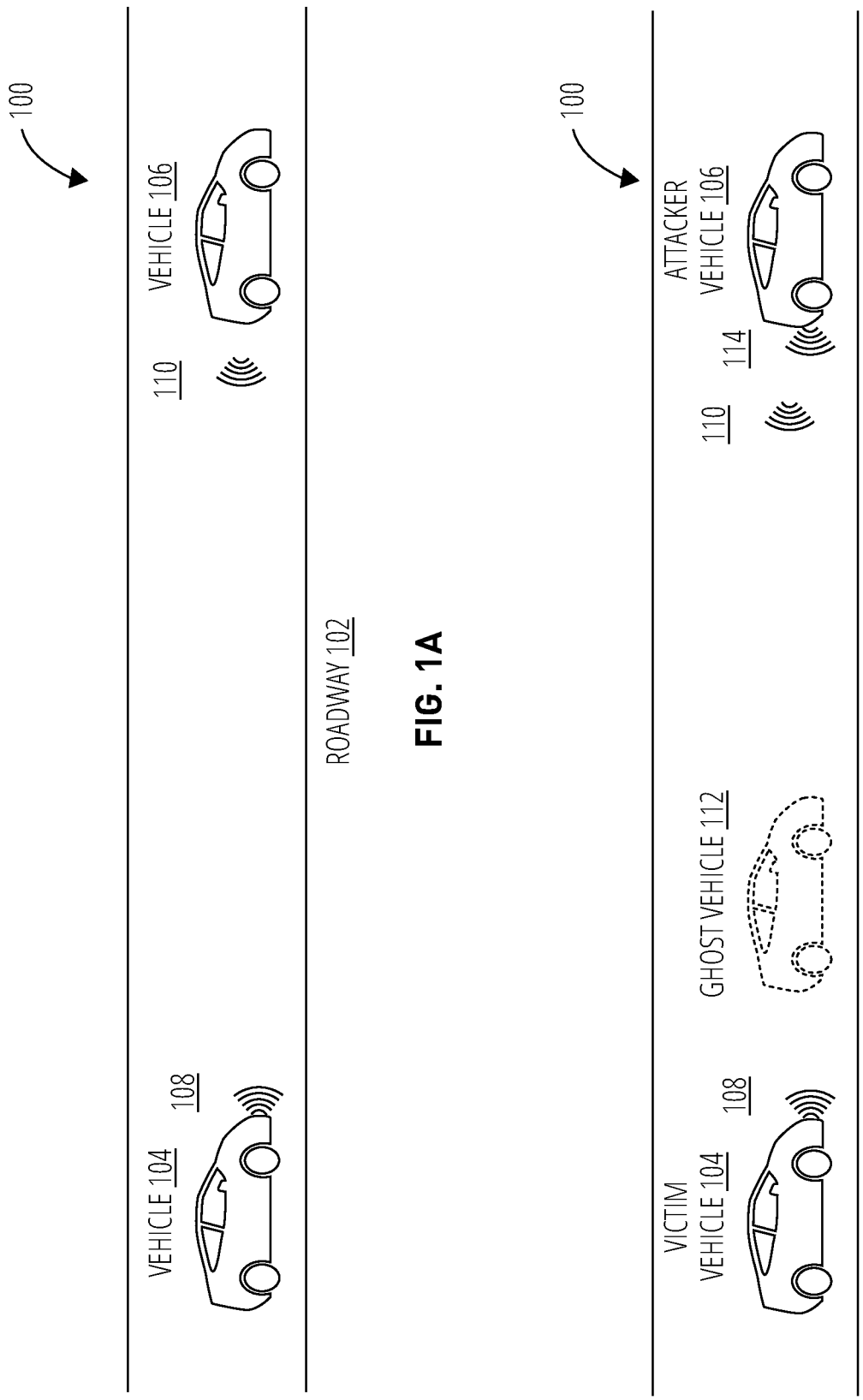
FIG. 1A illustrates an environment 100 in accordance with non-limiting example(s) of the present disclosure.
FIG. 1B illustrates the environment 100 in accordance with non-limiting example(s) of the present disclosure.

FIG. 1A and FIG. 1B depict an environment 100 in accordance with non-limiting example(s) of the present disclosure. The environment 100 includes a roadway 102 upon which vehicles can travel. For example, vehicles 104 and 106 are depicted. It is noted that a car is depicted in this and other figures herein. However, this is done for purposes of convenience and not to be limiting. That is, vehicles 104 and/or 106 could be another type of machine such as, a motorcycle, an airplane, a boat, or the like.

Vehicles 104 and 106 include a range sensing system (e.g., refer to FIG. 2) arranged to identify objects (e.g., other vehicles, humans, stationary objects, etc.) and/or determine range to the object(s). In a most basic system, vehicle 104 can be arranged to detect objects in front of vehicle 104 and determine whether the object is within a threshold distance based on signal 108 and reflection 110. In a more advanced system, vehicle 104 can be arranged to detect a number of objects adjacent to (e.g., in front, to the side, behind, etc.) vehicle 104 can determine a distance to the detected objects based on signal 108 and reflection 110.

Such range sensing systems are susceptible to malicious attacks. For example, FIG. 1B depicts vehicle 104 as victim vehicle 104 and vehicle 106 and attacker vehicle 106. During a malicious attack, attacker vehicle 106 can transmit an attacker signal 114, which can cause victim vehicle 104 to detect a ghost vehicle 112 based on signal 108 and attacker signal 114. Victim vehicle 104 may also detect attacker vehicle 106 based on signal 108 and reflection 110. In particular, attacker vehicle 106 can transmit attacker signal 114 based on mimicking, or spoofing, the waveform of signal 108 in order to induce detection of ghost vehicle 112. Furthermore, attacker vehicle 106 can control the time offset of attacker signal 114 in order to affect the range or distance with which victim vehicle 104 detects ghost vehicle 112.

The present disclosure provides a system (e.g., refer to FIG. 2), which can be implemented by a vehicle, such as victim vehicle 104, in order to distinguish actual targets (e.g., attacker vehicle 106) from ghost targets (e.g., ghost vehicle 112).

Figure 2:
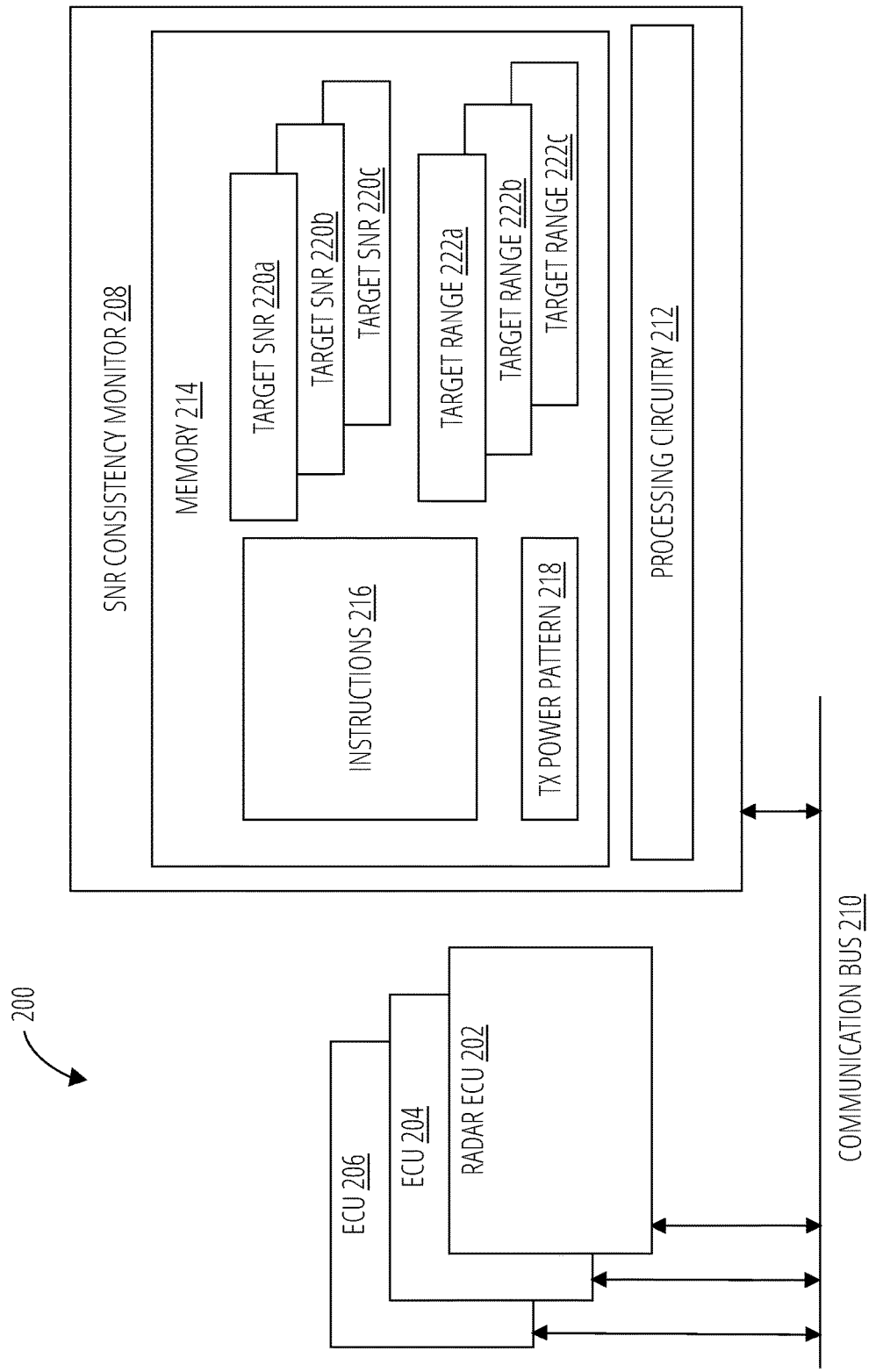
FIG. 2 illustrates a system 200 for a vehicle to distinguish ghost targets from legitimate targets, in accordance with non-limiting example(s) of the present disclosure.

FIG. 2 illustrates an example vehicle system 200, in accordance with non-limiting example(s) of the present disclosure. In general, system 200 can be implemented in any device where range sensing systems are used and can be implemented to provide the ghost target detection features disclosed herein. System 200 includes a number of electronic control units (ECUs), for example, ECU 202, ECU 204, and ECU 206, a SNR consistency monitor 208. ECU 202, ECU 204, and ECU 206 are coupled to SNR consistency monitor 208 via a communication bus 210. Communication bus 210 can be an in-vehicle network (IVN), such as, a Controller Area Network (CAN) bus, a FlexRay bus, a CAN FD bus, an automotive ethernet bus, or a local interconnected network (LIN) bus. Additionally, where implemented in contexts outside of the automotive space, the communication bus 210 can be a network bus adapted to the particular implementation, such as, for example, a communication network for manufacturing equipment, or the like.

In general, each of ECU 202, ECU 204, and ECU 206 include circuitry arranged to generate messages and transmit the messages onto communication bus 210 and/or consume messages from communication bus 210. The depicted ECUs (e.g., ECU 202, ECU 204, and ECU 206) can be any of a variety of devices, such as, for example, sensor devices, actuator devices, microprocessor control devices, or the like. As a specific example, ones of the ECUs 202, 204, and 206 can be a collision avoidance ECU, an automated braking ECU, a steering angle ECU, a heating and cooling ECU, an engine management ECU, or the like. At least one of the ECUs will be a radar ECU. For example, ECU 202 is depicted as a radar ECU. In general, radar ECU 202 can be coupled to hardware (e.g., circuitry, antennas, etc.) and arranged to transmit and receive radar signals (e.g., signal 108, reflection 110, attacker signal 114, or the like).

In general, signal-to-noise (SNR) consistency monitor 208 is arranged to distinguish ghost targets from legitimate targets outside the radar sensing pipeline. Said differently, SNR consistency monitor 208 is radar technology agnostic. As such, system 200 can be implemented in a variety of vehicles independent of the radar sensing technology utilized by the vehicle. With some examples, system 200, or rather SNR consistency monitor 208, can be implemented in an intrusion detection system (IDS) of a vehicle.

SNR consistency monitor 208 includes memory 214 and processing circuitry 212. Memory 214 includes instructions 216 (e.g., firmware, or the like) that can be executed by processing circuitry 212 as well as Transmitter (Tx) power pattern 218. In general, processing circuitry 212 can execute instructions 216 to distinguish an actual target (e.g., attacker vehicle 106) from a ghost target (e.g., ghost vehicle 112, or the like) based on the signal to noise ratio (SNR) of the radar signals as well as the range to the targets, which can be collected while the Tx power of the radar signals is varied according to Tx power pattern 218. To that end, memory 214 includes target SNRs 220a, 220b, and 220c and target ranges 222a, 222b, and 222c. During operation, processing circuitry 212 can execute instructions 216 to generate Tx power pattern 218 (e.g., from a random sequence, or the like). Further, processing circuitry 212 can execute instructions 216 to cause the transmit (Tx) power of radar the radar subsystem (e.g., ECU 202 and associated circuitry and antennas (not shown) arranged to emit signals like signal 108) to vary based on Tx power pattern 218. Further still, processing circuitry 212 can execute instructions 216 to receive an indication of target SNRs 220a, 220b, and 220c from the radar subsystem as well as receiving an indication of the target ranges 222a, 222b, and 222c.

In general, processing circuitry 212 can execute instructions 216 to distinguish an actual target (e.g., attacker vehicle 106) from a ghost target (e.g., ghost vehicle 112, or the like) based on a ration of the received SNRs (e.g., target SNRs 220a, 220b, 220c) over the range (e.g., target ranges 222a, 222b, and 222c). This is explained in greater detail below. However, in general, the present disclosure distinguishes ghost targets from actual targets as the SNR/R associated with the ghost targets is a function of the Tx power of the attacker vehicle 106 whereas the SNR-R of legitimate targets is a function of the Tx power of the victim vehicle 104. Accordingly, processing circuitry 212 executes instructions 216 to determine whether the SNR-R follows a pattern based on Tx power pattern 218 to distinguish ghost targets from legitimate targets.

Memory 214 can be based on any of a wide variety of information storage technologies. For example, memory 214 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 214 can include storage devices.

Processing circuitry 212 can include any of a variety of processors, such as, for example, commercial central processing units, application specific integrated circuits, or the like. Processing circuitry 212 can be a microprocessor or a commercial processor and can include one or multiple processing core(s) and can also include cache.

Figure 3:
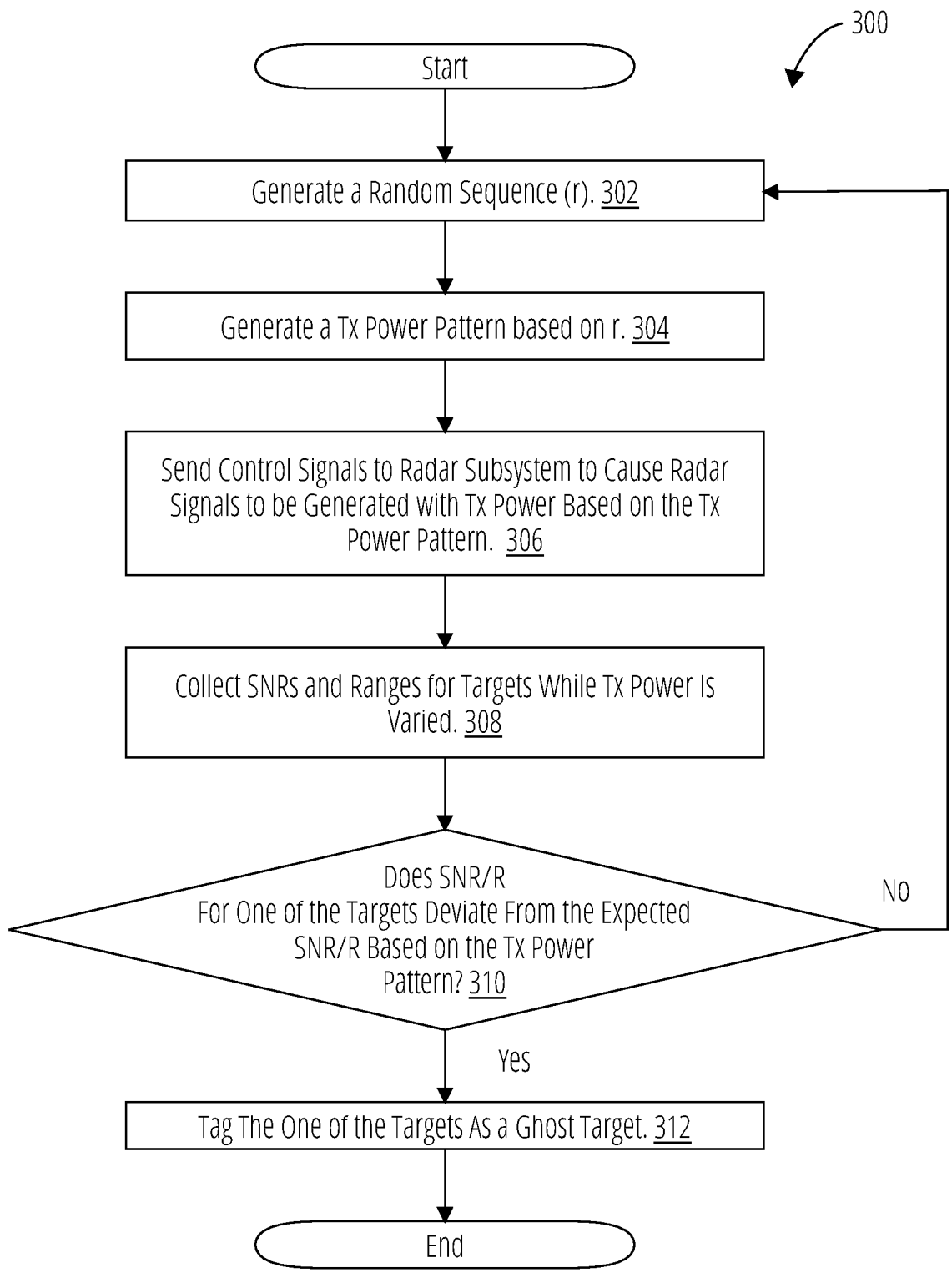
FIG. 3 illustrates a routine 300 to distinguish ghost targets from legitimate targets, in accordance with non-limiting example(s) of the present disclosure.

FIG. 3 depicts a routine 300, in accordance with non-limiting example(s) of the present disclosure. The routines and logic flows described herein, including routine 300, and other logic flows or routines described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Routine 300 can be implemented by an intrusion detection system (IDS) or other system arranged to distinguish ghost targets from real targets based on the SNR of the radar signals. For example, routine 300 can be implemented by SNR consistency monitor 208 of system 200, which itself can be implemented in a vehicle (e.g., victim vehicle 104, or the like). Routine 300 can begin at block 302 "generate a random sequence (r)" where an IDS can generate a random sequence (r). For example, processing circuitry 212 can execute instructions 216 to generate a random sequence. In some examples, a random number generator can be used to generate r. In other examples, hardware artifacts could be used to generate r. For example, processing circuitry 212 can execute instructions 216 to generate r based on thermal noise in components of the radar subsystem (e.g., ECU 202, radar PHY circuitry, radar antenna circuitry, or the like). As a further example, an amplifier or analog to digital (AD) converter could be employed to convert the physical phenomena to digital sequence r.

Continuing to block 304 "generate a Tx power pattern based on r" where an IDS can generate a Tx power pattern based on the sequence r. For example, processing circuitry 212 can execute instructions 216 to generate Tx power pattern 218 from r. As a specific example, Tx power may have an upper and lower bound. Said differently, signal noise floor may limit the lower practical power within which the radar subsystem can transmit. As such, processing circuitry 212 can execute instructions 216 to generate Tx power pattern 218 based on r and upper and/or lower bounds of the Tx power.

Continuing to block 306 "send control signals to radar subsystem to cause radar signals to be generated with Tx power based on the Tx power pattern" where the IDS can send control signals to the radar subsystem to cause the radar subsystem to transmit radar signals (e.g., signal 108, or the like) with Tx power based on the Tx power pattern generated at block 304. For example, processing circuitry 212 can execute instructions 216 to send control signals to radar ECU 202 to cause radar ECU 202 to transmit signal 108 with Tx power based on Tx power pattern 218.

Continuing to block 308 "collect SNRs and ranges for targets while Tx power is varied" where the IDS can collect SNRs and ranges for targets over a period of time in which the Tx power is varied. For example, processing circuitry 212 can execute instructions 216 to receive indications of SNRs and ranges and store the indications as target SNRs 220*a*, 220*b*, and 220*c* and target ranges 222*a*, 222*b*, and 222*c* in memory 214.

Continuing to decision block 310 "does SNR-R for one of the targets deviate from the expected SNR/R based on the Tx power pattern?" the IDS can determine whether the SNR-R for any one (or more) of the targets deviates from the expected SNR-R based on the Tx power pattern. For example, processing circuitry 212 can execute instructions 216 to determine whether the pattern represented by the SNR-R (e.g., target SNR 220*a*-target range 222*a*, or the like) deviates from the expected pattern given Tx power pattern 218. In particular, true target power at an ego receiver (e.g., victim vehicle 104, or the like) is a function of two-way propagation and can be represented by the following equation:

$$P_{RX_{target}}(R) = P_{TX_{ego}} G_{TX_{ego}} \frac{\sigma\lambda^2}{4\pi} \frac{1}{(4\pi R^2)^2} G_{RX_{ego}}$$

while ghost target power at the ego receiver (e.g., victim vehicle 104, or the like) is a function of one-way propagation and can be represented by the following equation:

$$P_{Rx_{ghost}}(R) = P_{TX_{attacker}} G_{TX_{attacker}} \frac{1}{(4\pi R^2)} \frac{\lambda^2}{4\pi} G_{RX_{ego}},$$

where given identical Tx parameters ($P_{TX_{ego}} = P_{TX_{attacker}}$, $G_{TX_{ego}} = G_{TX_{attacker}}$), P is power, G is gain, RX is receive, TX is transmit, R is range, $\lambda$ is the wavelength, and $\sigma$ is the radar cross section (e.g., 12 dBsm where the attacker is a car).

Given the above equations, processing circuitry 212 can execute instructions 216 to determine the SNR at range (R) for a true target based on the following equation:

$$SNR = \frac{P_{RX_{target}}}{P_N} = \frac{P_{TX_{ego}} G_{TX_{ego}} G_{RX_{ego}} \lambda^2 \sigma}{(4\pi)^3 R^4 k T_s B_n F_n L} \sim 1/R^4$$

while the SNR at range (R) for a ghost target can be derived based on the following equation:

$$SNR = \frac{P_{RX_{ghost}}}{P_N} = \frac{P_{TX_{attacker}} G_{TX_{attacker}} G_{RX_{ego}} \lambda^2}{(4\pi)^2 R^2 k T_s B_n F_n L} \sim 1/R^2,$$

where average noise power $P_N$ is given by the following equation: $P_N = kT_s B_n F_n L$, where k is Boltzmann's constant, B is bandwidth.

Figure 4:
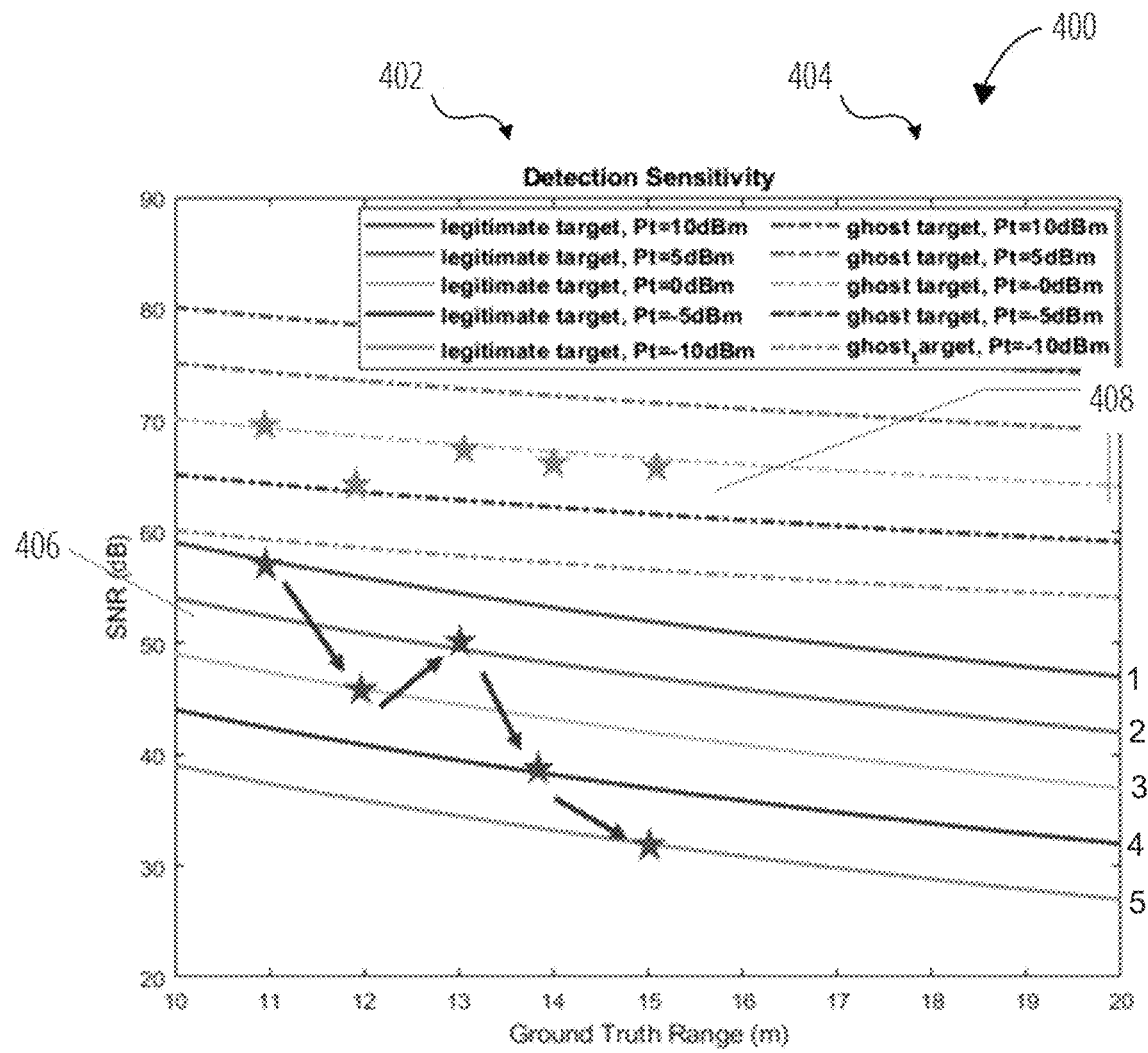
FIG. 4 illustrates a plot 400, in accordance with non-limiting example(s) of the present disclosure.

With some examples, processing circuitry 212 can execute instructions 216 to plot the SNR at R for each target and identify ghost targets are targets associated with curves that do not follow the true target pattern. For example, FIG. 4 illustrates a plot 400 showing a number of curves depicting the SNR v R for radar signals received at a receiver (e.g., receiver of victim vehicle 104, or the like). Ghost target curves 404 can be distinguished from legitimate target curves 402 as the patterns associated with the curves do not follow each other. In particular, the host target pattern 408 associated with the ghost target curves 404 does not track the Tx power pattern 406 associated with the legitimate target curves 402.

From decision block 310, routine 300 can continue to block 312 or return to block 302. In particular, routine 300 can continue to block 312 from decision block 310 based on a determination at decision block 310 that the SNR-R for one of the targets deviates from the expected SNR-R based on the Tx power pattern while routine 300 can return to block 302 from decision block 310 based on a determination at decision block 310 that the SNR-R for one of the targets does not deviate from the expected SNR-R based on the Tx power pattern.

At block 312 "tag the one of the targets as a ghost target" the IDS can tag the one of the targets with an SNR-R that deviates from the expected SNR-R as a potential ghost target. For example, processing circuitry 212 can execute instructions 216 to tag the target who it is determined has an SNR/R that deviates from the expected SNR-R at decision block 310 as a potential ghost target.

FIG. 4 illustrates a plot 400 showing legitimate target curves 402 and ghost target curves 404 as well as Tx power pattern 406. As depicted legitimate target curves 402 and ghost target curves 404 show SNR in decibels (dB) on the Y axis and Range in meters (m) on the X axis.

Figure 5:
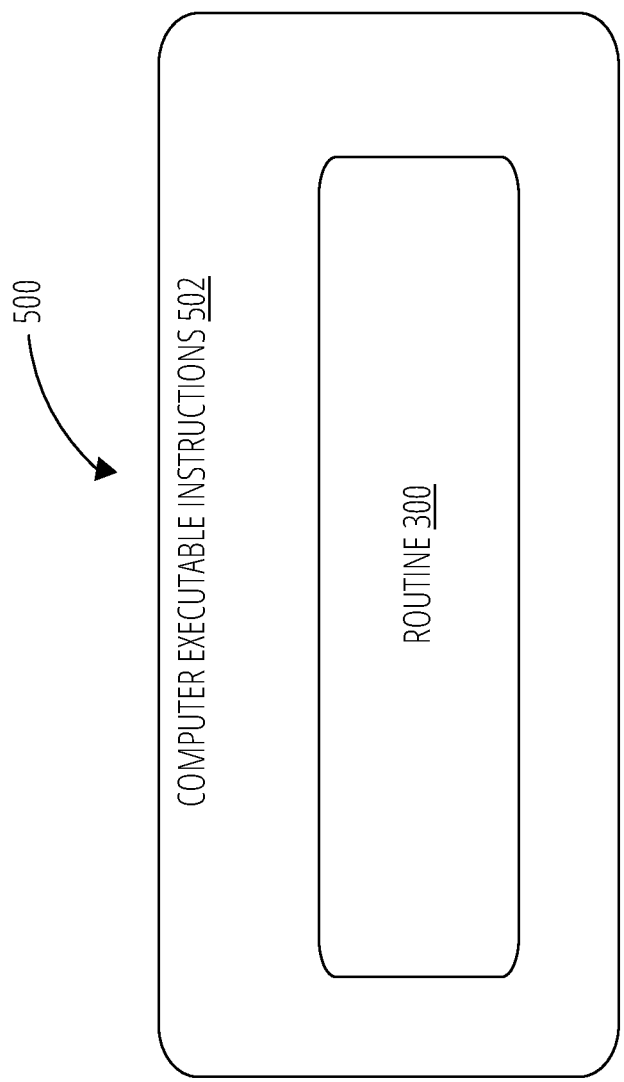
FIG. 5 illustrates a storage device 500, in accordance with non-limiting example(s) of the present disclosure.

FIG. 5 illustrates an example of a storage device 500. Storage device 500 may comprise an article of manufacture, such as, any non-transitory computer readable medium or machine readable medium, such as an optical, magnetic or semiconductor storage. Storage device 500 may store various types of computer executable instructions 502, such as instructions to implement routine 300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
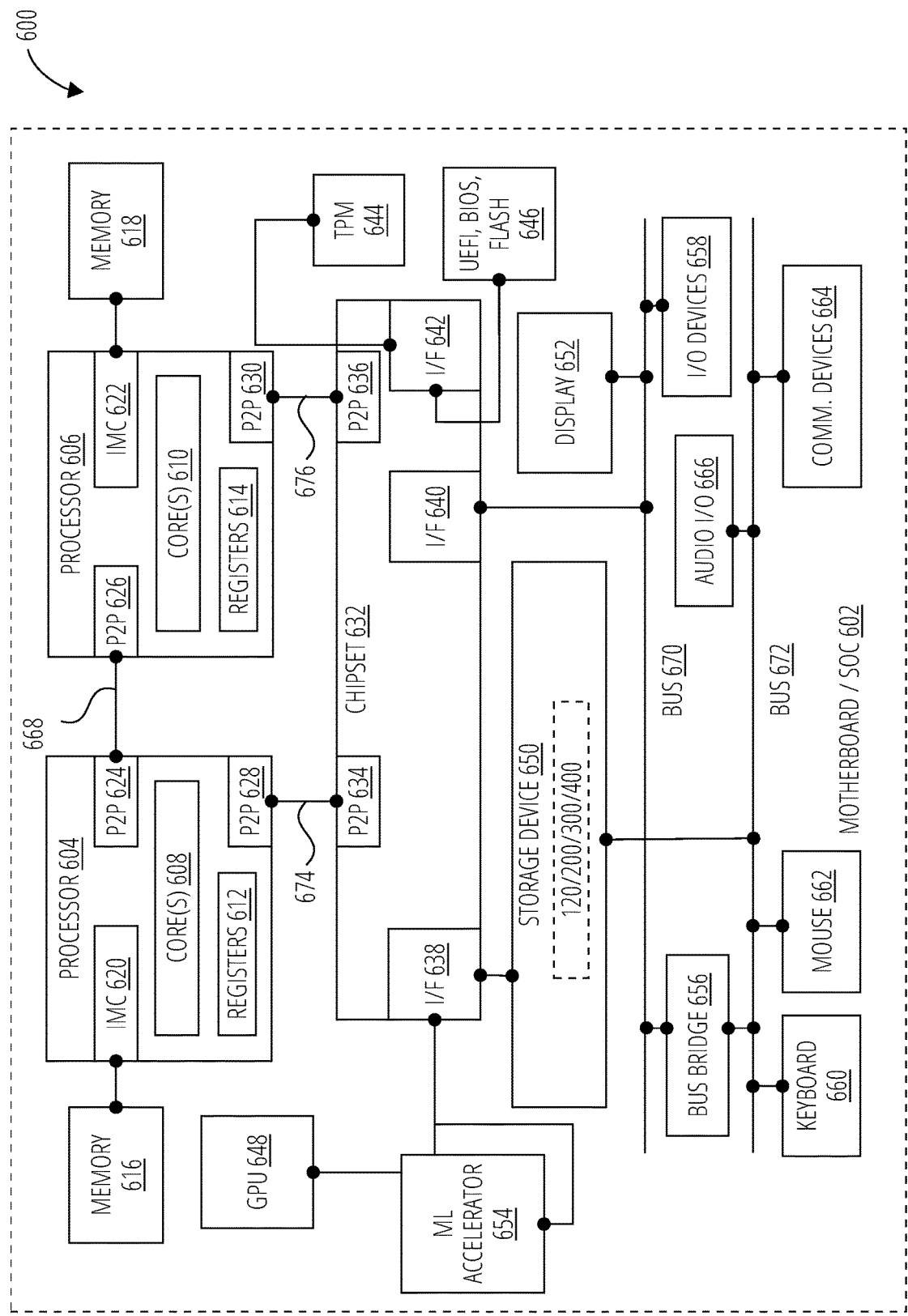
FIG. 6 illustrates a system 600, in accordance with non-limiting example(s) of the present disclosure.

FIG. 6 illustrates an embodiment of a system 600. System 600 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores. In at least one embodiment, the computing system 600 is representative of the components of the victim vehicle 104, system 200, and/or SNR consistency monitor 208. More generally, the computing system 600 is configured to implement all logic, systems, logic flows, methods, apparatuses, and functionality described herein. As a specific example, system 600 can be implemented as part of intrusion detection system and arranged to implement the feature of distinguishing a ghost from an actual target as described herein.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard or system-on-chip (SoC) 602 for mounting platform components. Motherboard or system-on-chip (SoC) 602 is a point-to-point (P2P) interconnect platform that includes a first processor 604 and a second processor 606 coupled via a point-to-point interconnect 668 such as an Ultra Path Interconnect (UPI). In other embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2 S) platform, other embodiments may include more than two sockets or one socket. For example, some embodiments may include a four-socket (4 S) platform or an eight-socket (8 S) platform. Each socket is a mount for a processor and may have a socket identifier. Note that the term platform refers to the motherboard with certain components mounted such as the processor 604 and chipset 632. Some platforms may include additional components and some platforms may include sockets to mount the processors and/or the chipset. Furthermore, some platforms may not have sockets (e.g. SoC, or the like).

The processor 604 and processor 606 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 604 and/or processor 606. Additionally, the processor 604 need not be identical to processor 606.

Processor 604 includes registers 612, integrated memory controller (IMC) 620 and point-to-point (P2P) interface 624 and P2P interface 628. Similarly, the processor 606 includes registers 614, IMC 622 as well as P2P interface 626 and P2P interface 630. IMC 620 and IMC 622 couple the processors processor 604 and processor 606, respectively, to respective memories (e.g., memory 616 and memory 618). Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 616 and memory 618 locally attach to the respective processors (i.e., processor 604 and processor 606). In other embodiments, the main memory may couple with the processors via a bus and shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e).

Processor 604 couples to a chipset 632 via P2P interface 628 and P2P 634 while processor 606 couples to a chipset 632 via P2P interface 630 and P2P 636. Direct media interface (DMI) 674 and DMI 676 may couple the P2P interface 628 and the P2P 634 and the P2P interface 630 and P2P 636, respectively. DMI 674 and DMI 676 may be a high-speed interconnect that facilitates, e.g., eight Giga Transfers per second (GT/s) such as DMI 3.0. In other embodiments, the processor 604 and processor 606 may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In other embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632. Additionally, ML accelerator 654 coupled to chipset 632 via I/F 638. ML accelerator 654 can be circuitry arranged to execute ML related operations (e.g., training, inference, etc.) for ML models. In particular, ML accelerator 654 can be arranged to execute mathematical operations and/or operands useful for machine learning.

Various I/O devices 658 and display 652 couple to the bus 670, along with a bus bridge 656 which couples the bus 670 to a second bus 672 and an I/F 640 that connects the bus 670 with the chipset 632. In one embodiment, the second bus 672 may be a low pin count (LPC) bus. Various devices may couple to the second bus 672 including, for example, a keyboard 660, a mouse 662 and communication devices 664.

Furthermore, an audio I/O 666 may couple to second bus 672. Many of the I/O devices 658 and communication devices 664 may reside on the motherboard or system-on-chip(SoC) 602 while the keyboard 660 and the mouse 662 may be add-on peripherals. In other embodiments, some or all the I/O devices 658 and communication devices 664 are add-on peripherals and do not reside on the motherboard or system-on-chip(SoC) 602.

Figure 7:
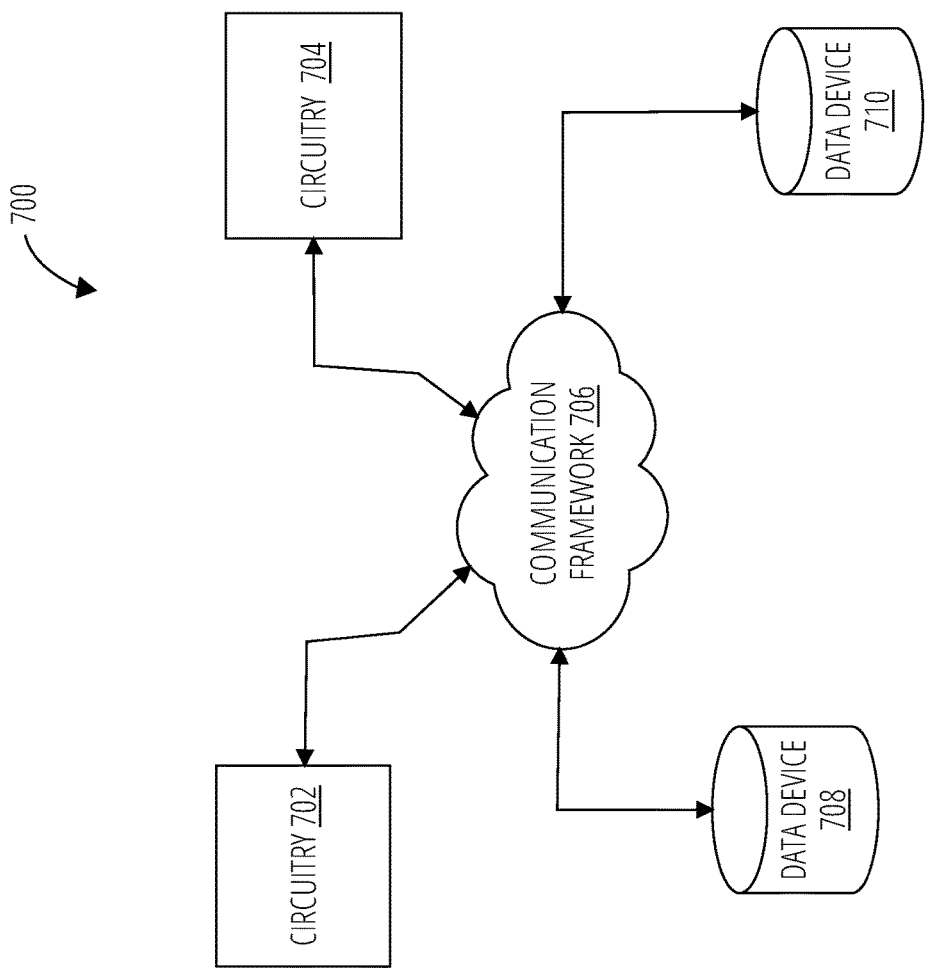
FIG. 7 illustrates an in-vehicle communication architecture 700, in accordance with non-limiting example(s) of the present disclosure.

FIG. 7 illustrates an in-vehicle communication architecture 700 according to one or more embodiments of the disclosure. For example, one or more vehicular devices, components, or circuits, such as circuitry 702 and/or circuitry 704, may communicate with each other via a communication framework 706, which may be an in-vehicle network, such as a CAN bus, implemented to facilitate the context based attacking mitigation techniques described herein.

The in-vehicle communication architecture 700 includes various common communications elements, such as a transmitter, receiver, transceiver, and so forth. The embodiments, however, are not limited to implementation by the in-vehicle communication architecture 700. As shown in this figure, the vehicular circuitry 702 and circuitry 704 may each be operatively connected to one or more respective data devices, such as, data device 708 and/or data device 710 that can be employed to store information local to the respective circuitry 702 and/or circuitry 704, such as radar signals, trajectories, velocities, ranges, or the like. It may be understood that the circuitry 702 and circuitry 704 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 706 in a vehicle.

Further, the communication framework 706 may implement any well-known communications techniques and protocols. As described above, the communication framework 706 may be implemented as a CAN bus protocol or any other suitable in-vehicle communication protocol. The communication framework 706 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 706 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments have more features than are expressly recited in each claim. Rather, as the following claims reflect, the described subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1. A computing apparatus comprising: a processor at an intrusion detection system of a vehicle; and memory storing instructions, which when executed by the processor configure the apparatus to: generate a transmit (Tx) power pattern; send one or more control signals to a radar transmitter to cause the radar transmitter to transmit a radar signal based on the Tx power pattern; receive at least one radar signal at a radar receiver; identify a signal to noise ratio (SNR) and a range associated with the at least one radar signal; determine whether the SNR and range of the at least one radar signal deviates from an expected SNR and range based on the Tx power pattern; and tag a target associated with the at least one radar signal as a ghost target based on a determination that the SNR and range of the at least one radar signal deviates from the expected SNR and range based on the Tx power pattern.

Example 2. The computing apparatus of example 1, the instructions when executed by the processor configure the apparatus to: generate a random sequence based in part on a physical process of hardware; and generate the Tx power pattern based on the random sequence.

Example 3. The computing apparatus of example 1, the instructions when executed by the processor configure the apparatus to: receive a first plurality of radar signals associated with a plurality of targets at the radar receiver, the target a one of the plurality of targets; send a first control signal to the radar transmitter to cause the radar transmitter to transmit the radar signal at a different Tx power; receive a second plurality of radar signals associated with the plurality of targets at the radar receiver; identify a one of the targets as a potential ghost target based on the first plurality of radar signals and the second plurality of radar signals.

Example 4. The computing apparatus of example 3, the instructions when executed by the processor configure the apparatus to generate the Tx power pattern responsive to identifying the one of the targets as a potential ghost target.

Example 5. The computing apparatus of example 4, the instructions when executed by the processor configure the apparatus to: identify the SNR and the range associated with each of the first plurality of radar signals and the second plurality of radar signals; derive an expected SNR over range for the second plurality of radar signals based on the SNR and the range of the first plurality of radar signals; and determine whether the SNR over range of a one of the second plurality of radar signals is a threshold distance away from the expected SNR over range of the second plurality of radar signals.

Example 6. The computing apparatus of example 5, wherein the threshold distance is 20 decibels (db).

Example 7. The computing apparatus of example 1, comprising the radar receiver and the radar transmitter.

Example 8. The computing apparatus of example 1, the vehicle comprising a plurality of electronic control units coupled to the processor by an in-vehicle network.

Example 9. A method, comprising: generating, at an intrusion detection system of a vehicle, a radar transmit (Tx) power pattern; sending one or more control signals to a radar transmitter of the vehicle to cause the radar transmitter to transmit a radar signal based on the radar Tx power pattern; receiving at least one radar signal at a radar receiver of the vehicle; identifying a signal to noise ratio (SNR) and a range associated with the at least one radar signal; determining whether the SNR and range of the at least one radar signal deviates from an expected SNR and range based on the radar Tx power pattern; and tagging a target associated with the at least one radar signal as a ghost target based on a determination that the SNR and range of the at least one radar signal deviates from the expected SNR and range based on the radar Tx power pattern.

Example 10. The method of example 9, comprising: generating a random sequence based in part on a physical process of hardware; and generating the Tx power pattern based on the random sequence.

Example 11. The method of example 9, comprising: receiving a first plurality of radar signals associated with a plurality of targets at the radar receiver, the target a one of the plurality of targets; sending a first control signal to the radar transmitter to cause the radar transmitter to transmit the radar signal at a different Tx power; receiving a second plurality of radar signals associated with the plurality of targets at the radar receiver; identifying a one of the targets as a potential ghost target based on the first plurality of radar signals and the second plurality of radar signals.

Example 12. The method of example 11, comprising generating the radar Tx power pattern responsive to identifying the one of the targets as a potential ghost target.

Example 13. The method of example 12, comprising: identifying the SNR and the range associated with each of the first plurality of radar signals and the second plurality of radar signals; deriving an expected SNR over range for the second plurality of radar signals based on the SNR and the range of the first plurality of radar signals; and determining whether the SNR over range of a one of the second plurality of radar signals is a threshold distance away from the expected SNR over range of the second plurality of radar signals.

Example 14. The method of example 13, wherein the threshold distance is 20 decibels (db).

Example 15. A non-transitory computer-readable storage medium, the computer-readable storage medium including instructions that when executed by circuitry of an intrusion detection system (IDS) of a vehicle, cause the IDS to: generate a radar transmit (Tx) power pattern; send one or more control signals to a radar transmitter of the vehicle to cause the radar transmitter to transmit a radar signal based on the radar Tx power pattern; receive at least one radar signal at a radar receiver of the vehicle; identify a signal to noise ratio (SNR) and a range associated with the at least one radar signal; determine whether the SNR and range of the at least one radar signal deviates from an expected SNR and range based on the radar Tx power pattern; and tag a target associated with the at least one radar signal as a ghost target based on a determination that the SNR and range of the at least one radar signal deviates from the expected SNR and range based on the radar Tx power pattern.

Example 16. The computer-readable storage medium of example 15, including instructions that when executed by the circuitry of the IDS of the vehicle, cause the IDS to: generate a random sequence based in part on a physical process of hardware; and generate the Tx power pattern based on the random sequence.

Example 17. The computer-readable storage medium of example 15, including instructions that when executed by the circuitry of the IDS of the vehicle, cause the IDS to: receive a first plurality of radar signals associated with a plurality of targets at the radar receiver, the target a one of the plurality of targets; send a first control signal to the radar transmitter to cause the radar transmitter to transmit the radar signal at a different Tx power; receive a second plurality of radar signals associated with the plurality of targets at the radar receiver; identify a one of the targets as a potential ghost target based on the first plurality of radar signals and the second plurality of radar signals.

Example 18. The computer-readable storage medium of example 17, including instructions that when executed by the circuitry of the IDS of the vehicle, cause the IDS to generate the radar Tx power pattern responsive to identifying the one of the targets as a potential ghost target.

Example 19. The computer-readable storage medium of example 18, including instructions that when executed by the circuitry of the IDS of the vehicle, cause the IDS to: identify the SNR and the range associated with each of the first plurality of radar signals and the second plurality of radar signals; derive an expected SNR over range for the second plurality of radar signals based on the SNR and the range of the first plurality of radar signals; and determine whether the SNR over range of a one of the second plurality of radar signals is a threshold distance away from the expected SNR over range of the second plurality of radar signals.

Example 20. The computer-readable storage medium of example 19, wherein the threshold distance is 20 decibels (db).

Example 21. An apparatus, comprising: means for generating, at an intrusion detection system of a vehicle, a radar transmit (Tx) power pattern; means for sending one or more control signals to a radar transmitter of the vehicle to cause the radar transmitter to transmit a radar signal based on the radar Tx power pattern; means for receiving at least one radar signal at a radar receiver of the vehicle; means for identifying a signal to noise ratio (SNR) and a range associated with the at least one radar signal; means for determining whether the SNR and range of the at least one radar signal deviates from an expected SNR and range based on the radar Tx power pattern; and means for tagging a target associated with the at least one radar signal as a ghost target based on a determination that the SNR and range of the at least one radar signal deviates from the expected SNR and range based on the radar Tx power pattern.

Example 22. The apparatus of example 21, comprising: means for generating a random sequence based in part on a physical process of hardware; and means for generating the Tx power pattern based on the random sequence.

Example 23. The apparatus of example 21, comprising: means for receiving a first plurality of radar signals associated with a plurality of targets at the radar receiver, the target a one of the plurality of targets; means for sending a first control signal to the radar transmitter to cause the radar transmitter to transmit the radar signal at a different Tx power; means for receiving a second plurality of radar signals associated with the plurality of targets at the radar receiver; and means for identifying a one of the targets as a potential ghost target based on the first plurality of radar signals and the second plurality of radar signals.

Example 24. The apparatus of example 23, comprising means for generating the radar Tx power pattern responsive to identifying the one of the targets as a potential ghost target.

Example 25. The apparatus of example 24, comprising: means for identifying the SNR and the range associated with each of the first plurality of radar signals and the second plurality of radar signals; means for deriving an expected SNR over range for the second plurality of radar signals based on the SNR and the range of the first plurality of radar signals; and means for determining whether the SNR over range of a one of the second plurality of radar signals is a threshold distance away from the expected SNR over range of the second plurality of radar signals.

Example 26. The apparatus of example 25, wherein the threshold distance is 20 decibels (db).

What is claimed is:

1. A computing apparatus comprising:
a processor at an intrusion detection system operably coupled to a vehicle; and
memory storing instructions, which when executed by the processor configure the apparatus to:
generate a random sequence based in part on a random physical process of hardware;
generate a transmit (Tx) power pattern based on the random sequence;
send one or more control signals to a radar transmitter to cause the radar transmitter to transmit a radar signal based on the Tx power pattern;
receive at least one radar signal at a radar receiver;
identify a signal to noise ratio (SNR) and a range associated with the at least one radar signal;
determine whether the SNR and range of the at least one radar signal deviates from an expected SNR and range based on the Tx power pattern; and
tag a target associated with the at least one radar signal as a ghost target based on a determination that the SNR and range of the at least one radar signal deviates from the expected SNR and range based on the Tx power pattern, wherein the at least one radar signal is a spoofed signal.

2. The computing apparatus of claim 1, the instructions when executed by the processor configure the apparatus to:
receive a first plurality of radar signals associated with a plurality of targets at the radar receiver, the target a one of the plurality of targets;
send a first control signal to the radar transmitter to cause the radar transmitter to transmit the radar signal at a different Tx power;
receive a second plurality of radar signals associated with the plurality of targets at the radar receiver;
identify a one of the targets as a potential ghost target based on the first plurality of radar signals and the second plurality of radar signals.

3. The computing apparatus of claim 2, the instructions when executed by the processor configure the apparatus to generate the Tx power pattern responsive to identifying the one of the targets as a potential ghost target.

4. The computing apparatus of claim 3, the instructions when executed by the processor configure the apparatus to:
identify the SNR and the range associated with each of the first plurality of radar signals and the second plurality of radar signals;
derive an expected SNR over range for the second plurality of radar signals based on the SNR and the range of the first plurality of radar signals; and
determine whether the SNR over range of a one of the second plurality of radar signals is a threshold distance away from the expected SNR over range of the second plurality of radar signals.

5. The computing apparatus of claim 4, wherein the threshold distance is 20 decibels (db).

6. The computing apparatus of claim 1, comprising the radar receiver and the radar transmitter.

7. The computing apparatus of claim 1, the vehicle comprising a plurality of electronic control units coupled to the processor by an in-vehicle network.

8. A method, comprising:
generating, at an intrusion detection system of a vehicle, a random sequence based in part on a random physical process of hardware;
generating, at the intrusion detection system of a vehicle, a radar transmit (Tx) power pattern based on the random sequence;
sending one or more control signals to a radar transmitter of the vehicle to cause the radar transmitter to transmit a radar signal based on the radar Tx power pattern;
receiving at least one radar signal at a radar receiver of the vehicle;
identifying a signal to noise ratio (SNR) and a range associated with the at least one radar signal;
determining whether the SNR and range of the at least one radar signal deviates from an expected SNR and range based on the radar Tx power pattern; and
tagging a target associated with the at least one radar signal as a ghost target based on a determination that the SNR and range of the at least one radar signal deviates from the expected SNR and range based on the radar Tx power pattern, wherein the at least one radar signal is a spoofed signal.

9. The method of claim 8, comprising:
receiving a first plurality of radar signals associated with a plurality of targets at the radar receiver, the target a one of the plurality of targets;
sending a first control signal to the radar transmitter to cause the radar transmitter to transmit the radar signal at a different Tx power;
receiving a second plurality of radar signals associated with the plurality of targets at the radar receiver;
identifying a one of the targets as a potential ghost target based on the first plurality of radar signals and the second plurality of radar signals.

10. The method of claim 9, comprising generating the radar Tx power pattern responsive to identifying the one of the targets as a potential ghost target.

11. The method of claim 10, comprising:
identifying the SNR and the range associated with each of the first plurality of radar signals and the second plurality of radar signals;
deriving an expected SNR over range for the second plurality of radar signals based on the SNR and the range of the first plurality of radar signals; and
determining whether the SNR over range of a one of the second plurality of radar signals is a threshold distance away from the expected SNR over range of the second plurality of radar signals.

12. The method of claim 11, wherein the threshold distance is 20 decibels (db).

13. A non-transitory computer-readable storage medium, the computer-readable storage medium including instructions that when executed by circuitry of an intrusion detection system (IDS) of a vehicle, cause the IDS to:
generate a random sequence based in part on a random physical process of hardware;
generate a radar transmit (Tx) power pattern based on the random sequence;
send one or more control signals to a radar transmitter of the vehicle to cause the radar transmitter to transmit a radar signal based on the radar Tx power pattern;
receive at least one radar signal at a radar receiver of the vehicle;
identify a signal to noise ratio (SNR) and a range associated with the at least one radar signal;
determine whether the SNR and range of the at least one radar signal deviates from an expected SNR and range based on the radar Tx power pattern; and
tag a target associated with the at least one radar signal as a ghost target based on a determination that the SNR and range of the at least one radar signal deviates from the expected SNR and range based on the radar Tx power pattern, wherein the at least one radar signal is a spoofed signal.

14. The computer-readable storage medium of claim 13, including instructions that when executed by the circuitry of the IDS of the vehicle, cause the IDS to:
receive a first plurality of radar signals associated with a plurality of targets at the radar receiver, the target a one of the plurality of targets;
send a first control signal to the radar transmitter to cause the radar transmitter to transmit the radar signal at a different Tx power;
receive a second plurality of radar signals associated with the plurality of targets at the radar receiver;
identify a one of the targets as a potential ghost target based on the first plurality of radar signals and the second plurality of radar signals.

15. The computer-readable storage medium of claim 14, including instructions that when executed by the circuitry of the IDS of the vehicle, cause the IDS to generate the radar Tx power pattern responsive to identifying the one of the targets as a potential ghost target.

16. The computer-readable storage medium of claim 15, including instructions that when executed by the circuitry of the IDS of the vehicle, cause the IDS to:
identify the SNR and the range associated with each of the first plurality of radar signals and the second plurality of radar signals;
derive an expected SNR over range for the second plurality of radar signals based on the SNR and the range of the first plurality of radar signals; and
determine whether the SNR over range of a one of the second plurality of radar signals is a threshold distance away from the expected SNR over range of the second plurality of radar signals.

17. The computer-readable storage medium of claim 16, wherein the threshold distance is 20 decibels (db).

* * * * *